C. O. HANSEN.
FRICTION CLUTCH.
APPLICATION FILED APR. 26, 1919.

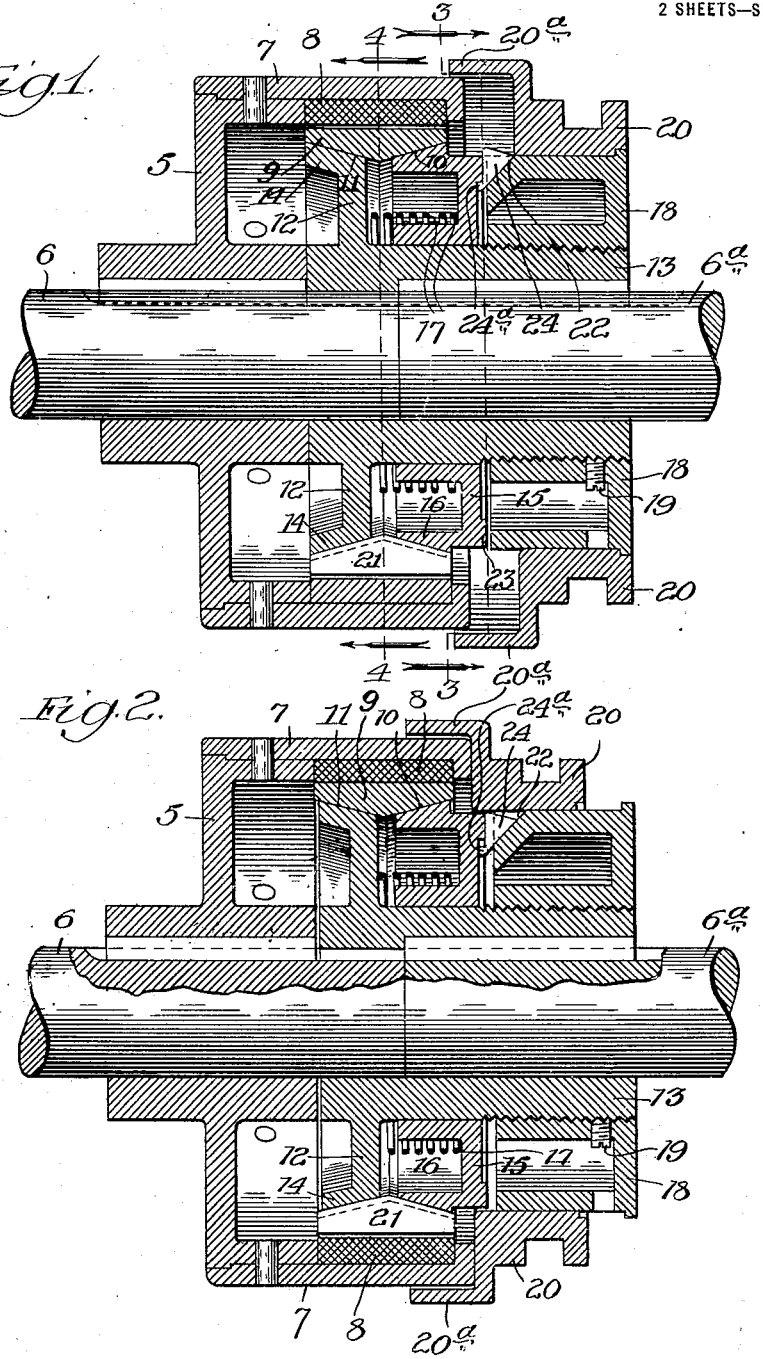

1,338,298.

Patented Apr. 27, 1920.

2 SHEETS—SHEET 2.

Witnesses:
C. E. Taylor,
A. Kovarik.

Inventor:
Clifford O. Hansen,
By Dyrenforth, Lee, Chritton & Wiles
Attys.

UNITED STATES PATENT OFFICE.

CLIFFORD OSCAR HANSEN, OF TIFFIN, OHIO.

FRICTION-CLUTCH.

1,338,298.  Specification of Letters Patent.  Patented Apr. 27, 1920.

Application filed April 26, 1919. Serial No. 292,876.

*To all whom it may concern:*

Be it known that I, CLIFFORD O. HANSEN, a citizen of the United States, residing at Tiffin, in the county of Seneca and State of Ohio, have invented a new and useful Improvement in Friction-Clutches, of which the following is a specification.

This invention relates to an improvement in friction-clutches for use in transmitting power.

Figure 3:
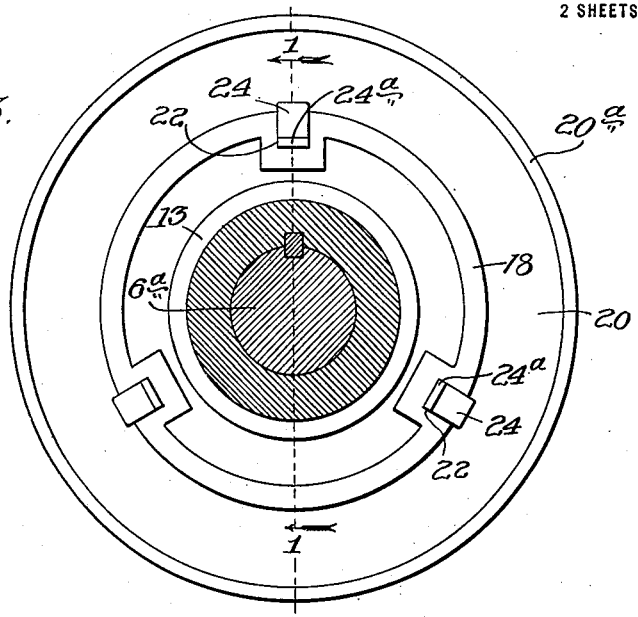
Figure 4:
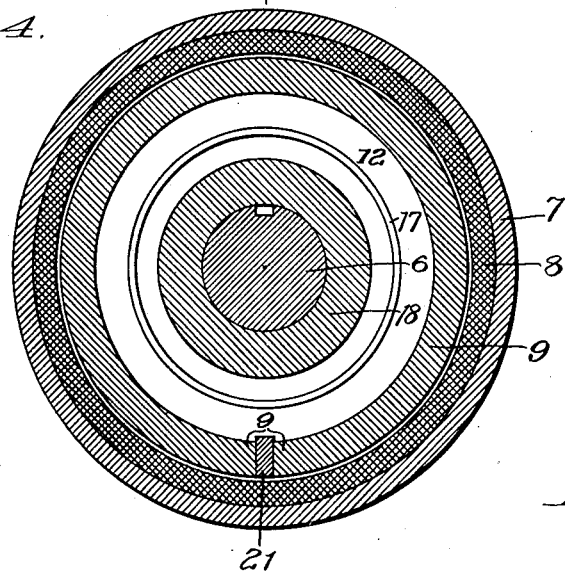
Figure 5:
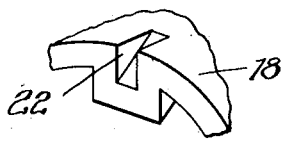
Figure 6:
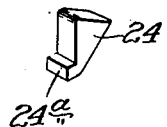

In the accompanying drawings, Figure 1 is a section on line 1, Fig. 3, of the improved friction-clutch in its unshipped condition and in operative position on a driving shaft and a driven shaft; Fig. 2 is a similar view showing the clutch in its shipped condition; Fig. 3 is a section on line 3, Fig. 1; Fig. 4 is a section on line 4, Fig. 1; Fig. 5 is a broken perspective view of the abutment-nut feature of the device, showing one of a plurality of beveled recesses therein, and Fig. 6 is a perspective view of a wedge to engage said recess.

A circular head 5, keyed at its hub to a drive-shaft 6, has pinned to it a cylinder 7. This cylinder may be lined with material 8, preferably compressed paper, to afford a friction surface against which a split ring 9, of spring steel, forming the outer expansible clutch-member, is to be pressed as hereinafter described. The inner face of the ring presents beveled surfaces, as shown at 10 and 11, converging V-like in cross-section toward the circumferential center of the ring. An inner annular clutch-member 12 has a sleeve 13 keyed to a driven shaft $6^a$ and a circumferential web terminating in a head 14 conforming on its outer surface to the ring-surface 11 to operate wedgingly against the latter. A companion clutch-member 15, shown in the form of a hollow annulus, surrounds the sleeve 13 and is movable longitudinally thereon; and the outer circumferential surface of its head 16 conforms to the ring-surface 10. Between the members 12 and 13 may be interposed a spiral spring 17 tending to force apart these members and overcome any binding or sticking tendency thereof when released, as hereinafter explained, for unshipping the clutch; though the spring is a minor feature and may be entirely dispensed with. The outer end of the sleeve 13 is threaded and carries adjustably an abutment-nut 18, fastened in adjusted position by a set-screw 19. A circumferentially recessed collar 20 is supported on the nut 18 to be shifted along it, and is adapted to have a lever (not shown) applied to it in the recess, for shifting the collar. Each member 12 and 15 contains a transverse groove in its outer beveled face, and a key 21, of the contour shown, projects into these grooves and between the ends of the split expansion-ring to insure rotation of the latter with the adjacent clutch-members and prevent slipping of the latter against the ring.

As thus far described, the foregoing description substantially applies to the friction-clutch of Letters Patent of the United States, No. 1,115,928, dated November 3, 1914, on which the present invention is an improvement particularly in the matter of simplifying the construction.

In the inner face of the abutment-nut 18, which is shown of hollow construction for lightness and economy in metal, are provided, at suitable intervals apart, three beveled recesses 22, or recesses having inclined bases (Fig. 5); and the clutch-member 15 has a circumferential counter-bore in its outer face forming an annular shoulder 23. In each recess 22 is contained a wedge 24 having a toe $24^a$ engaging the annular shoulder 23 for confining the wedges in the recesses against dislodgment. In the unshipped condition of the clutch, represented in Fig. 1, angular sections of these wedges project into the path along the nut 18 of the collar 20 in shifting the latter to ship the clutch.

The collar is shown to be provided with an annular extension $20^a$ to project over the adjacent end of the cylinder 7 and act as a shield to exclude dust and other foreign matter from the clutch.

To operate the clutch for coupling the shaft $6^a$ to the drive shaft, the collar 20 is shifted from its position in Fig. 1 to that shown in Fig. 2, thereby encountering the wedges 24 in its path and pressing them inwardly toward the shaft $6^a$, whereby they act against the nut 18 to pull outwardly the clutch-member 12 and against the clutch-member 15 to force it inwardly against the opposing surfaces 10 and 11 of the ring to expand it into frictional contact with the lining 8 and thus clutch the shafts together. Shifting the collar in the opposite direction permits movement of the wedges in the outward direction to the position represented in Fig. 1 with resultant separation of the members 12 and 15 to unship the clutch.

Any wear between the engaging surfaces of the nut and the wedges may be readily compensated for by adjusting the nut toward the wedges.

I realize that considerable variation is possible in the details of construction thus specifically shown and described, and I do not intend by illustrating a single specific or preferred embodiment of my invention to be limited thereto; my intention being, in the following claims, to claim protection upon all the novelty there may be in my invention as broadly as the state of the art will permit.

I claim:

1. In a friction-clutch, the combination of a cylinder provided with an inner friction-surface, an expansion-ring in the cylinder having its inner surface beveled to converge toward its circumferential center, clutch-members within said ring provided with beveled outer surfaces to engage, respectively, said beveled ring-surfaces, an abutment connected with the inner clutch-member and provided with beveled recesses, wedges confined in said recesses adjacent the outer clutch-member and bodily slidable downwardly and inwardly therein, and a collar shiftably supported on said abutment and into the path of which the wedges project in the unshipped condition of the clutch.

2. In a friction-clutch, the combination of a cylinder provided with an inner friction-surface, an expansion-ring in the cylinder having its inner surface beveled to converge toward its circumferential center, clutch-members within said ring provided with beveled outer surfaces to engage, respectively, said beveled ring-surfaces, the outer clutch-member having an annular shoulder, an abutment connected with the inner clutch-member and provided with beveled recesses, wedges in said recesses and bodily slidable downwardly and inwardly therein and engaging said shoulder for confining the wedges in the recesses, and a collar shiftably supported on said abutment and into the path of which the wedges project in the unshipped condition of the clutch.

3. In a friction-clutch, the combination of a cylinder provided with an inner friction-surface, an expansion-ring in the cylinder having its inner surface beveled to converge toward its circumferential center, clutch-members within said ring provided with beveled outer surfaces to engage, respectively, said beveled ring-surfaces, the outer clutch-member having an annular shoulder, an abutment connected with the inner clutch-member and provided with beveled recesses, wedges in said recesses and bodily slidable downwardly and inwardly therein and provided with toes engaging said shoulder for confining the wedges in the recesses, a collar shiftably supported on said abutment and into the path of which the wedges project in the unshipped condition of the clutch, and an annular dust-shield extending from the collar about the adjacent end of the cylinder.

CLIFFORD OSCAR HANSEN.